United States Patent [19]
Brewer et al.

[11] Patent Number: 5,886,692
[45] Date of Patent: Mar. 23, 1999

[54] ATTRACTING AND REPELLING EDIT BLOCKS IN A USER INTERFACE OF A VIDEO EDITOR

[75] Inventors: Eric T. Brewer, Saratoga; Baldo A. Faieta, San Francisco, both of Calif.; Clifford A. Grabhorn, Atlanta, Ga.

[73] Assignee: FutureTel, Inc., Sunnyvale, Calif.

[21] Appl. No.: 968,550

[22] Filed: Nov. 12, 1997

Related U.S. Application Data

[60] Provisional application No. 60/044,384 Nov. 15, 1996.
[51] Int. Cl.⁶ ..................................................... G06F 3/14
[52] U.S. Cl. ........................ 345/328; 345/326; 345/333; 345/340
[58] Field of Search ................................... 345/326, 328, 345/333, 334, 340; 707/530

[56] References Cited

U.S. PATENT DOCUMENTS

| | | | |
|---|---|---|---|
| 5,148,154 | 9/1992 | Mackay | 345/339 |
| 5,404,316 | 4/1995 | Klingler | 707/530 |
| 5,590,262 | 12/1996 | Isadore-Barreca | 345/328 |
| 5,664,216 | 9/1997 | Blumenau | 345/328 |
| 5,682,326 | 10/1997 | Klingler | 345/328 |
| 5,684,715 | 11/1997 | Palmer | 345/326 |

OTHER PUBLICATIONS

PC Video Create your own Movies, Eisenkolb & Weickardt, Abacus Software, 1994–1995.

*Primary Examiner*—Raymond J. Bayerl
*Assistant Examiner*—Thomas T. Nguyen
*Attorney, Agent, or Firm*—Beyer & Weaver, LLP

[57] ABSTRACT

The use of blocks in a workspace window that depict various video elements on the user interface of a video editor for use on a digital computer having a CPU, memory and a video display. The blocks have the attributes that they attract or repel other blocks as a function of proximity to each other in order to reduce user errors and to improve user efficiency. The method of manipulating the blocks on the video display consists of the following steps: First, specify coordinates of interaction regions around a block to be dragged. Next, test the coordinates of the interaction regions against the coordinates of all other blocks on the video display. Next, repel the block to be dragged from specified surfaces of the other blocks in accordance with predetermined rules that specify which surfaces of the block to be dragged and which surfaces of the other blocks repel each other. Finally, attach the block to be dragged to the surface of blocks whose coordinates are within the interaction region in accordance with predetermined rules that specify which surfaces of the block to be dragged and which surfaces of the other blocks attract each other.

20 Claims, 10 Drawing Sheets

ATTRACTING AND REPELLING EDIT BLOCKS IN A USER INTERFACE OF A VIDEO EDITOR

This application claims benefit of USC Provisional Appl. 60/044,384, filed Nov. 15, 1996.

CROSS-REFERENCE TO RELATED APPLICATIONS

Please refer to co-pending application application Ser. No. 08/968,026 filed on Nov. 12, 1997 by Brewer, et al. entitled VIDEO CURSOR WITH ZOOM IN THE USER INTERFACE OF A VIDEO EDITOR

BACKGROUND OF THE INVENTION

1. Field of the Invention

The subject invention relates to user interfaces for video editors. More particularly, the invention relates to the use of blocks in a workspace window that depict various video elements and which attract or repel other blocks as a function of proximity to each other in order to reduce user errors and to improve user efficiency.

2. Description of the Prior Art

A video consists of electronically stored images called frames that are played back on a video display terminal such as a CRT. Videos may be in either an analog or digital format. However, the digital computer has proven to be very useful in editing video. Thus, many analog videos are converted to digital for editing. The present invention relates to the editing of digital videos. A digital video is a sequence of image frames that are stored in the memory of a digital computer and replayed in frame sequence at a high frame rate, called video rate, to provide full motion images. Because computers have limited memory and because videos consume large amounts of memory, most videos are stored in a compressed format. The compression format standard currently in wide use is called Motion Picture Experts Group ("MPEG") which is described in detail in the following documents which are hereby incorporated by reference: (1) a document entitled Generic Coding of Moving Pictures and Associated Audio Information; Video, ISO/IEC 13818-2; (2) a document entitled Coding of Moving Pictures and Associated Audio for Digital Storage Media at up to about 1.5 MBit/sec (Part 3 Audio) 3-11171 rev 1 (1995); and (3) a document entitled Generic Coding of Moving Pictures and Associated Audio Information ISO/IEC 13818-3. All above-referenced MPEG standard documents may be obtained from ISO/IEC Case Postale 56, CH 1211, Geneva 20, Switzerland.

Video elements consist of digital files containing sound, video clips, still pictures, overlays and transitions. Video editors are in general used to arrange and modify these elements. In the context of the present invention, video clips and sound are illustrated as-blocks on the user interface. The user may rearrange the blocks, add overlays and transitions. In this way, the user forms a long track of frames which constitute the edited video. Because the user is constantly manipulating blocks on a workspace window, it is desirable to have the blocks behave in a most convenient and intuitive manner.

SUMMARY OF THE INVENTION

The invention consists of the use of blocks in a workspace window of a video editor on a digital computer that depict various video elements and which attract or repel other blocks as a function of proximity to each other in order to reduce user errors and to improve user efficiency. The video data is stored framewise in the memory and portions of the video data are represented by blocks on the video display. The method of manipulating the blocks on the video display consists of the following steps: First, specify coordinates of interaction regions around a block to be dragged. Next, test the coordinates of the interaction regions against the coordinates of all other blocks on the video display. Next, repel the block to be dragged from specified surfaces of the other blocks in accordance with predetermined rules that specify which surfaces of the block to be dragged and which surfaces of the other blocks repel each other. Finally, attach the block to be dragged to the surface of blocks whose coordinates are within the interaction region in accordance with predetermined rules that specify which surfaces of the block to be dragged and which surfaces of the other blocks attract each other.

BRIEF DESCRIPTION OF THE DRAWING

The invention will now be described in conjunction with the Drawing wherein.

DESCRIPTION OF THE PREFERRED EMBODIMENT

The present invention will be described in connection with a conventional digital computer having a CPU, memory and a video display and using a windows based operating system where a mouse moves a mouse cursor on the video display and various elements on the display may be dragged from one position to another on the video display by moving the mouse cursor to the element to be moved, depressing a button on the mouse and moving the mouse cursor to a new location on the video display and releasing the mouse button.

Figure 1:
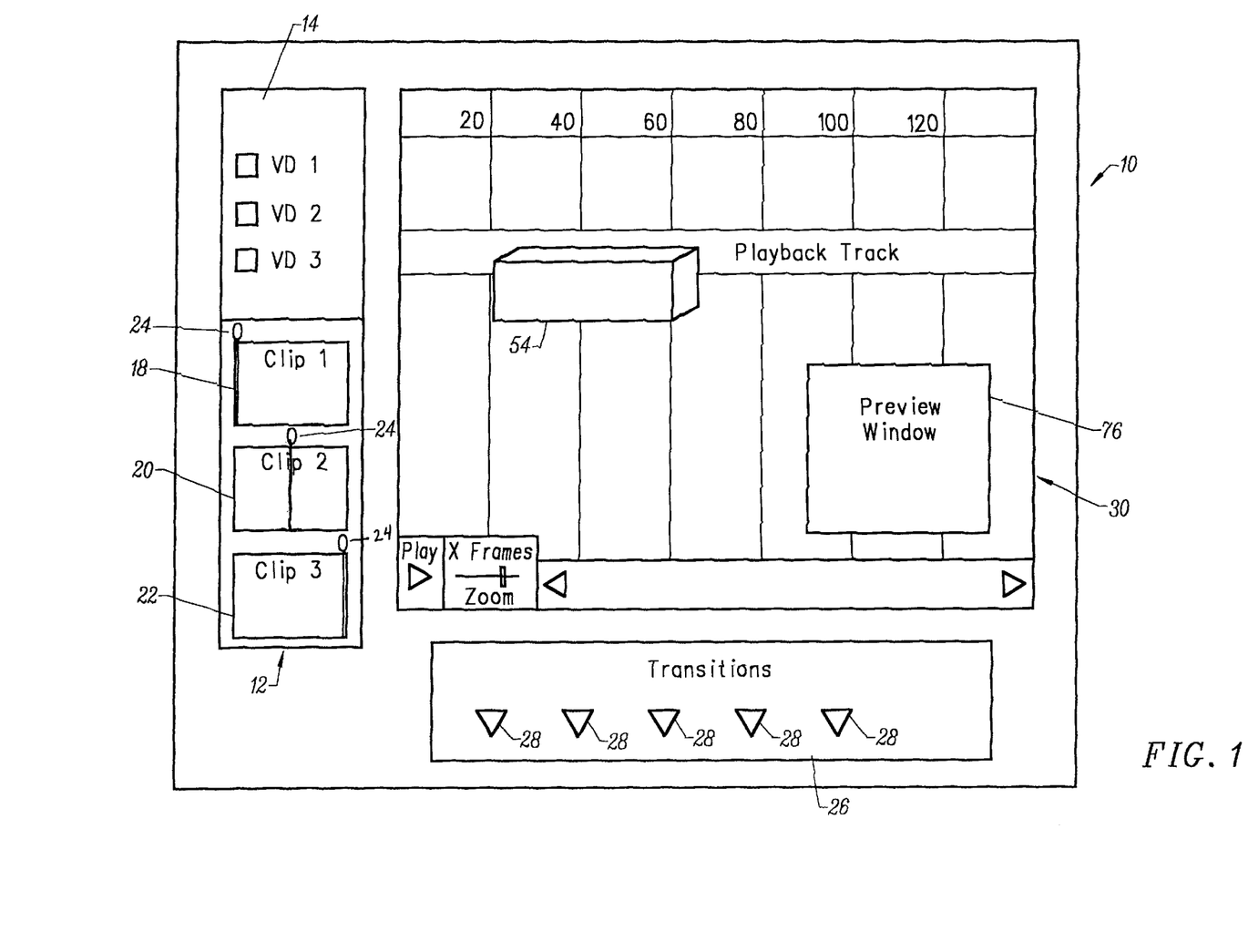
FIG. 1 is a view of the user interface elements according to the present invention.

FIG. 1 is a view of the user interface elements with which the present invention operates. Referring now to FIG. 1, reference numeral 10 designates the entire user interface which appears on a conventional video display terminal. User interface 10 includes a thumbnail clips window 12 which provides information on the available video element files such as sound files, video clip files and picture files and is a source of such elements to be dragged for further editing. Thumbnail clips window consists of a directories window 14 containing information on the video directories in use and a thumbnail views window 16 which provides views indicative of the contents of the video element files within the current selected directory. In this example, 3 thumbnail views 18, 20 and 22 are illustrated. Each thumbnail view shows a frame of the associated video element file. The actual frame shown is dependent on the position of a thumbnail cursor 24. If the video clip has sound, then a sound icon, not shown, appears on the corners of the thumbnail view. The user can select which frame in a thumbnail is shown by dragging thumbnail cursor 24 horizontally in either direction. The left-most position corresponds to the beginning of the clip and the right-most position corresponds to the end of the clip.

User interface 10 also contains transitions window 26 which is a palette of available transitions. A transition is represented by a triangular block. In this case, there are 5 different transitions 28.

User interface 10 also contains a workspace window 30. Workspace window 30 is the area of the user interface where video editing takes place. Material to be edited is brought to the workspace window 30 by dragging thumbnail views from thumbnail clips window 12 to workspace window 30. When a thumbnail crosses into workspace window 30, it becomes a block. Blocks represent segments of video elements and are constructed as best shown with reference to FIGS. 2(a) and 2(b).

Figure 2A:
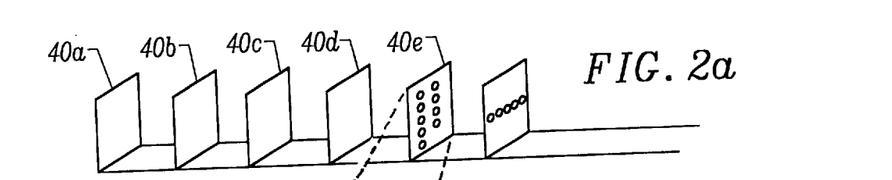
FIGS. 2(a)–(c) are a perspective illustration of how three dimensional tomographic blocks representing video clips are made.
Figure 2B:
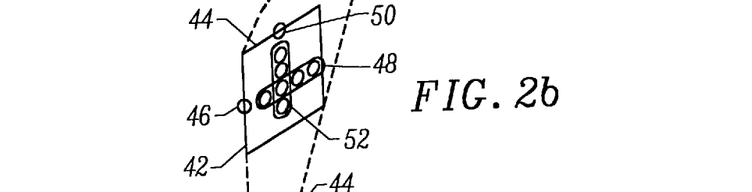
Figure 2C:
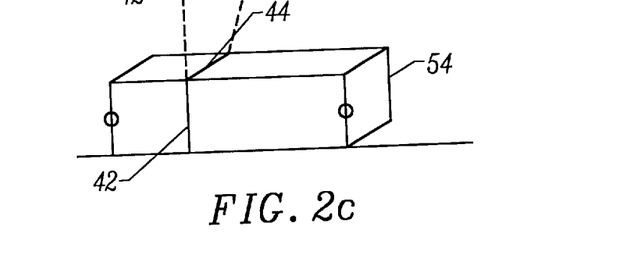

FIGS. 2a–2c is a schematic views of video frames stacked horizontally. Referring now to FIG. 2, video frames 40 (a)–(e) are stacked in the order in which they are viewed. Each frame is made up of rows and columns of picture elements called pixels. In order to form a block, each independent frame is converted to a vertical line 42 and a diagonal line 44. Each pixel on vertical line 42 is a composite of all pixels with which it aligned horizontally and each pixel on diagonal line 44 is a composite of all pixels with which it is aligned vertically as illustrated in FIG. 2(b). For example, in frame 40(e) of FIG. 2(b), pixel 46 is a composite of the column of pixels shown and in frame 40(e), pixel 50 is a composite of row of pixels 52. FIG. 2(c) shows that in block 54, each independent frame is a single vertical line 42 and a diagonal line 44 made up of composite pixels. The composite may, for example, be a function of color and grey scale and may be the mean or median of all pixels in that row or column or the brightest pixel therein.

Figure 3:
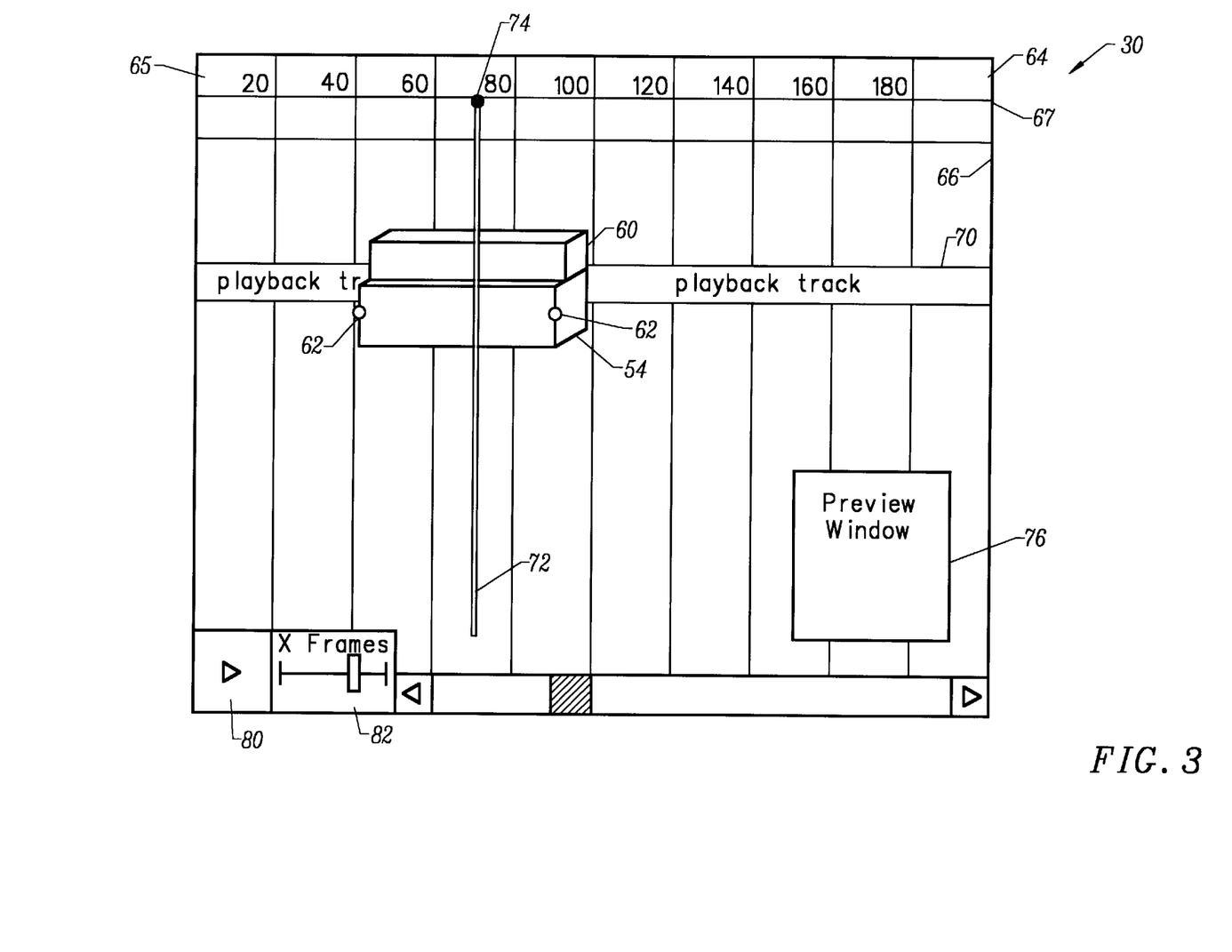
FIG. 3 is a detailed view of workspace window with multiple blocks.

FIG. 3 is a detailed view of workspace window 30. Blocks in workspace window 30 behave as solid objects in that they can touch other blocks but cannot overlap or blend with other blocks. Blocks can be copied and pasted within the workspace window 30. When a new video element is dragged into workspace window 30, it becomes a block. the video element is a video clip, then a video block appears in workspace window 30. For example, thumbnail 18 (as depicted in FIG. 1), can be dragged into workspace window 30 and there becomes block 54 which represents a segment of a video clip that initially does not exceed 2 seconds in length. Once a block is in workspace window 30, the user can reedit that block. If the video clip represented by the thumbnail view is longer than 2 seconds, the portion of the segment that is dragged into window is centered around the current position of thumbnail cursor 24 (as depicted in FIG. 1). If the video clip has an associated sound track, a sound block 60 also appears in workspace window 30 attached to the video block. At the right and left end of each block there is a ball 62 that serves as a handle to reedit the blocks. That is, balls 62 point to frames in memory. Moving either of balls 62 changes their respective pointers to a new frame in memory. In this way, the size of blocks may be altered.

Workspace window 30 includes a timing ruler 64 which contains timing reference marks 66 consisting of vertical bars that extend from top to bottom of workspace window 30. Timing ruler starts at its origin 65 at the far left and ends at the horizontal limit 67.

Workspace window 30 also contains a horizontal stripe, 70 called a playback track ("PBT") and a video cursor consisting of a vertical shaft 72 and a knob 74.

Workspace window 30 contains a preview window 76 which shows a single frame. Blocks that are on the playback track such as block 54 are played in preview window 76. The location of video cursor shaft 72 determines which frame in block 54 is shown in playback window 76. As the video cursor is moved along block 54 in the horizontal direction, it passes across successive frames in block 54 and as it passes over a frame, that frame appears in playback window 76. Preview window 76 also shows the edited video while being played at video rates. The preview window is connected to the window that the user is currently using. If the user is previewing thumbnails, in a Thumbnail window, then it is associated with that window. If on the other hand the user is editing in workspace window 30, then it is connected to workspace window 30. Workspace window 30 also contains a start button 80 on which the user clicks to start a play of the edited video.

The horizontal-axis in the workspace window is a mapping of time to distance. Timing reference marks indicate the number of frames per unit distance along the horizontal axis—that is the number of frames per horizontal pixel of the video display.

Because the completed product coming from the video editor is a video that may play for several minutes, the aggregate string of block along playback track 70 may be very long. Therefore it is very useful to have a zoom feature that allows the user to change the scale of the horizontal axis—that is the number of frames per pixel. Accordingly a zoom feature is provided that allows the user to vary the horizontal scale from a minimum of one frame per pixel to an arbitrarily large number of frames per pixel. The zoom scale or factor is modified when the user drags knob 74 either up or down in the vertical direction only. The size of knob 74 is changed to correspond to changes in the zoom factor. Knob 74 is smallest when it is nearest to timing ruler 64 and becomes larger as it approaches playback track 70. Thus, knob 74 is small when the zoom factor is small and large when it is large. The zoom factor affects the timing reference marks of timing ruler 64. The distance between timing marks is determined by a user adjustable factor, K, times the zoom factor, X. Typically K is about 20. A zoom scale 82 shows the level of zoom in workspace window 30.

Figure 3A:
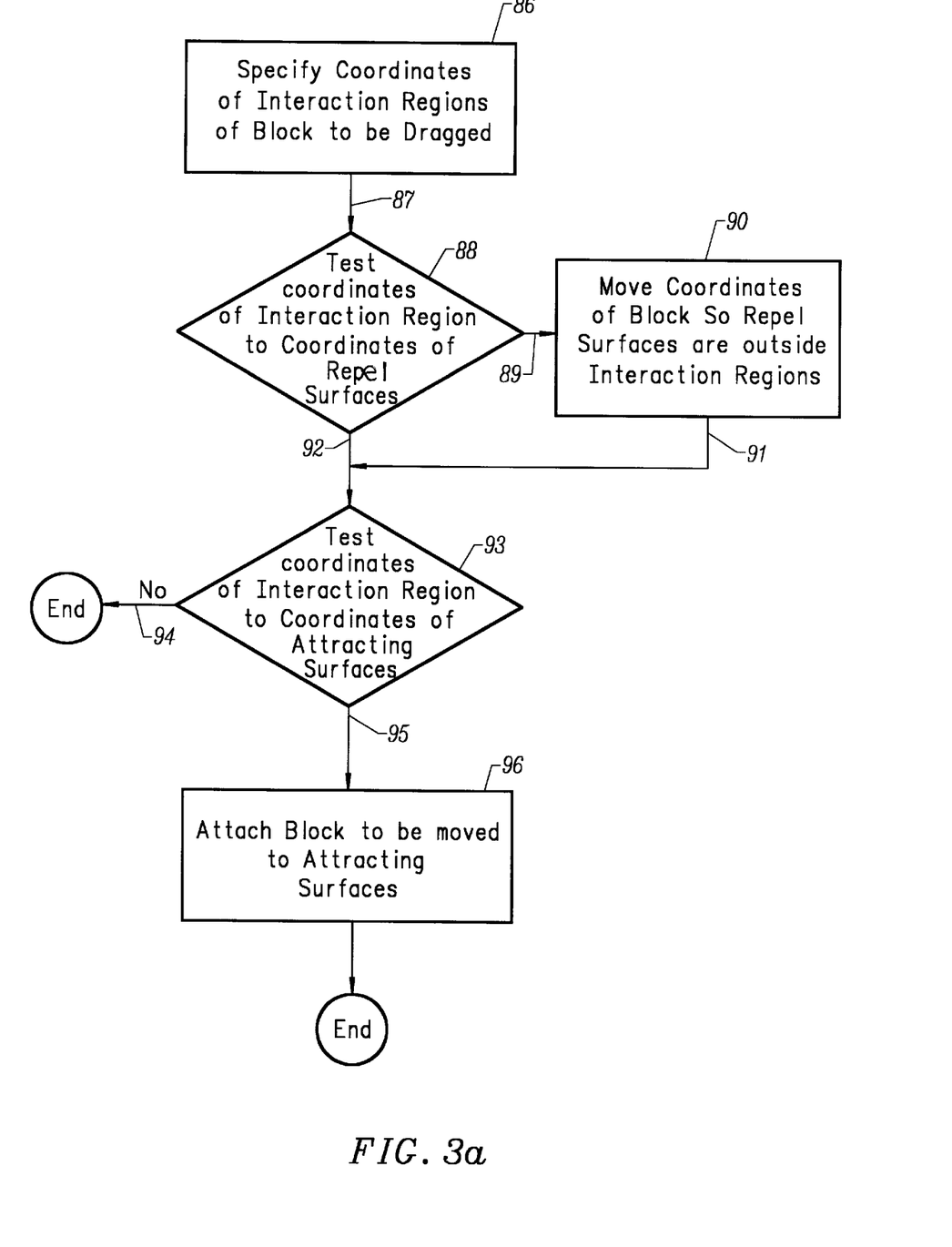
FIG. 3(a) is a high level flow chart of the present invention.

FIG. 3(a) is a high level flow chart of the present invention. Referring now to FIG. 3 (a), at process block 86 the coordinates of interactive regions around a block to be dragged is specified. From process block 86, follow process path 87 to decision block 88 where the coordinates of the interaction regions of the block to be dragged are compared with the coordinates of repelling surfaces. If the coordinates are such that a repelling surface falls within an interaction region of the block to be dragged, then follow process path 89 to process block 90 where the coordinates of the block to be dragged are moved so that the coordinates of repelling surfaces do not fall with the interaction regions. From process block 90 follow process path 91 to decision block 93. Also, if the decision in decision block 88 is no, follow process path 92 to decision block 93 where the coordinates of the interaction regions of the block to be dragged are compared with the coordinates of attracting surfaces. If the coordinates are such that an attracting surface falls within an interaction region of the block to be dragged, then follow process path 95 to process block 96 where the coordinates of the block to be dragged are moved so that the block is attached to the attracting surfaces. If the decision in decision block 93 is no, follow process path 94 and end the routine.

The attraction and repelling relationships between the blocks on workspace window 30 are as follows:

The left end of any block is attracted to the right end of any like block. That is, the left end of a video block is attracted to the right end of a video block.

The top of a sound block is attracted to the bottom of a sound block.

The top of video blocks is attracted to the bottom of a sound blocks.

All blocks are attracted to the playback strip.

Overlay frames are attracted to video blocks.

Transition blocks are attracted to the joints of video blocks.

Every other combination of block pairs repel each other.

Figure 4:
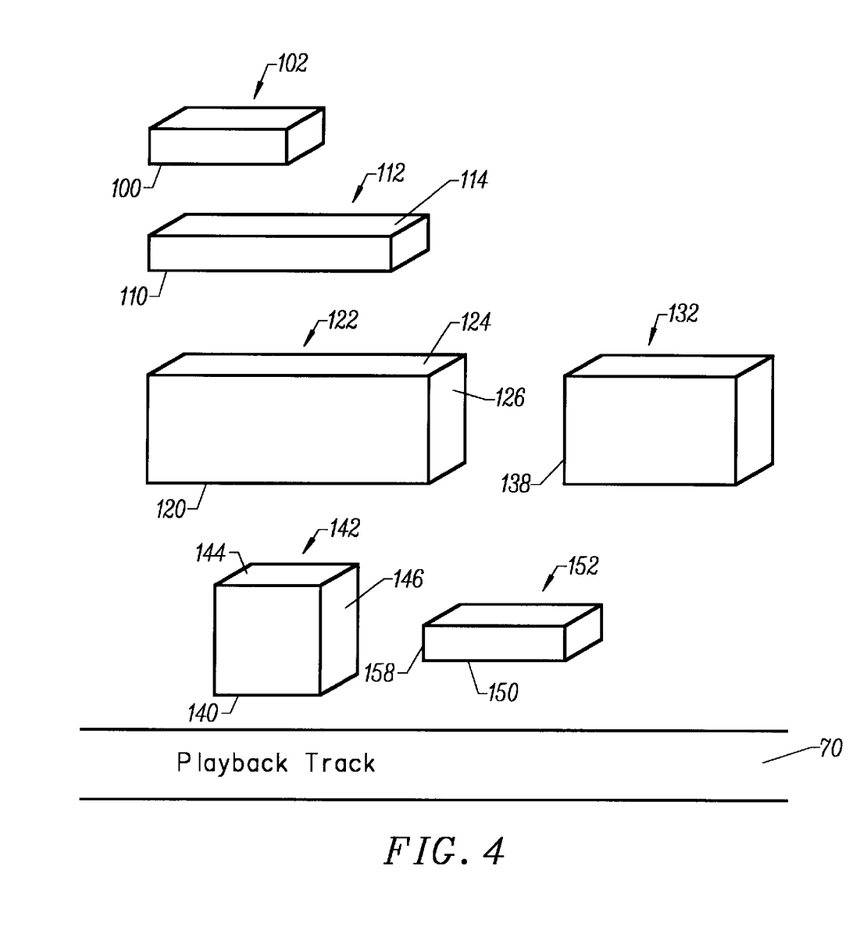
FIG. 4 is a view the various attraction and repelling combinations of blocks.

FIG. 4 is a schematic showing the video clip and sound video elements as blocks and their attraction and repulsion relationships. Referring now to FIG. 4, bottom surface 100 of music block 102 is attracted to top surface 114 of video block 112. Bottom surface 110 of music block 112 is attracted to top surface 124 of video block 122. Left end surface 138 of video block 132 is attracted to right end surface 126 of video block 122. Left end surface 158 of music block 152 is attracted to the right end surface 146 of video block 142. Bottom surface 140 of video block 142 is attracted to playback track 70. And, bottom surface 150 of sound block 152 is attracted to playback track 70.

Figure 5:
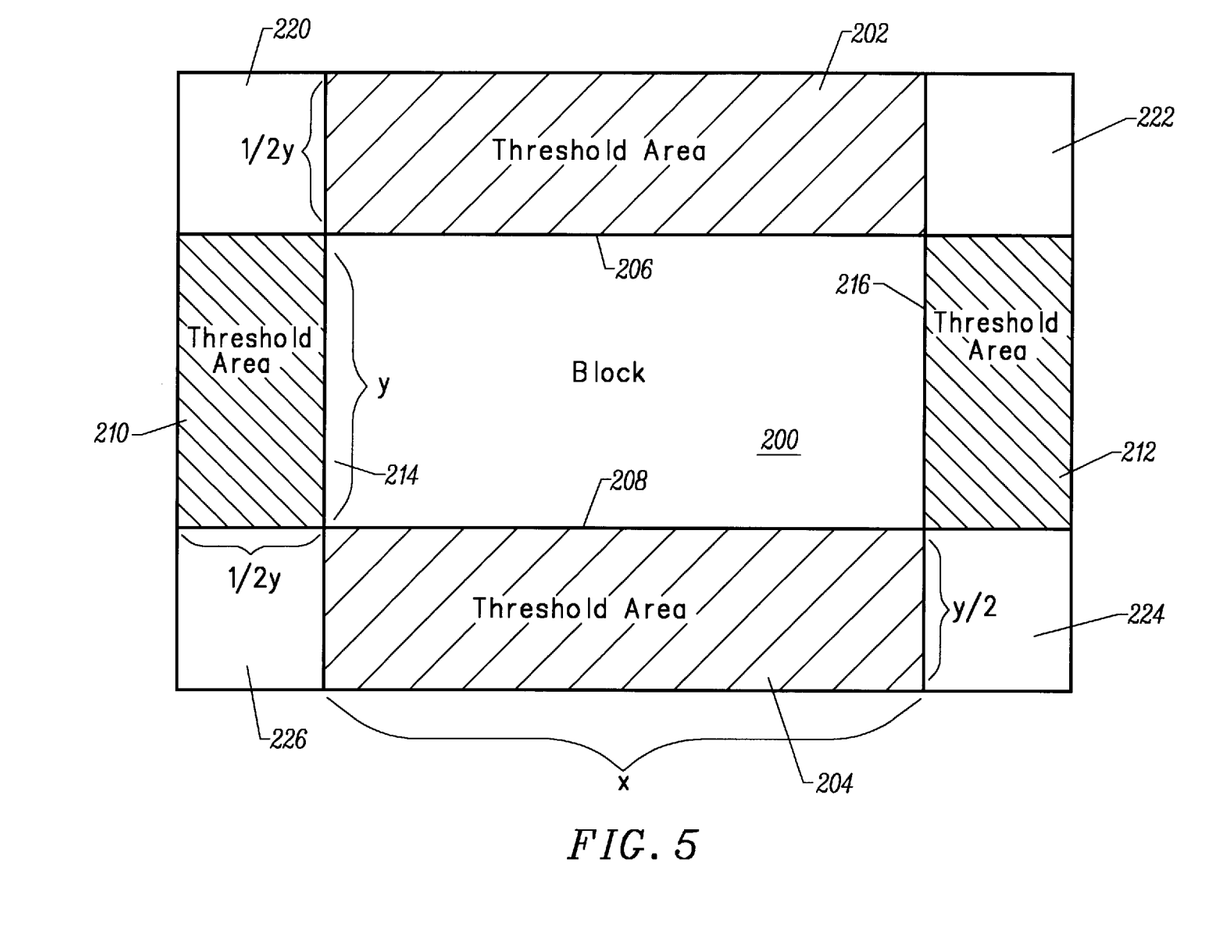
FIG. 5 is a view of a block with attendant interaction regions.

FIG. 5 shows a video element block with its other block interaction regions. Referring now to FIG. 5, block 200 represents any video element. Block 200 is of arbitrary length, x, which will vary with the number of frames represented by the block and by the zoom factor. Block 200 is of height, y, which does not vary with the number of frames represented by the block or by the zoom factor. Four interaction regions are constructed as follows: A left end area 210 which is y in height and y/2 in length is added to the left end 214 of block 200. A right end area 212 which y in height and y/2 in length is added to right end 216 of block 200. A top area 202 having a length x and a height of y/2 is added to top 206 of block 200. A bottom area 204 having a length x and a height of y/2 is added to bottom 208 of block 200. Corner areas 220, 222, 224 and 226 are not interaction areas. Playback track 70 also has a interaction region added to its top which is also y/2 in height and runs its entire length.

Figure 6:
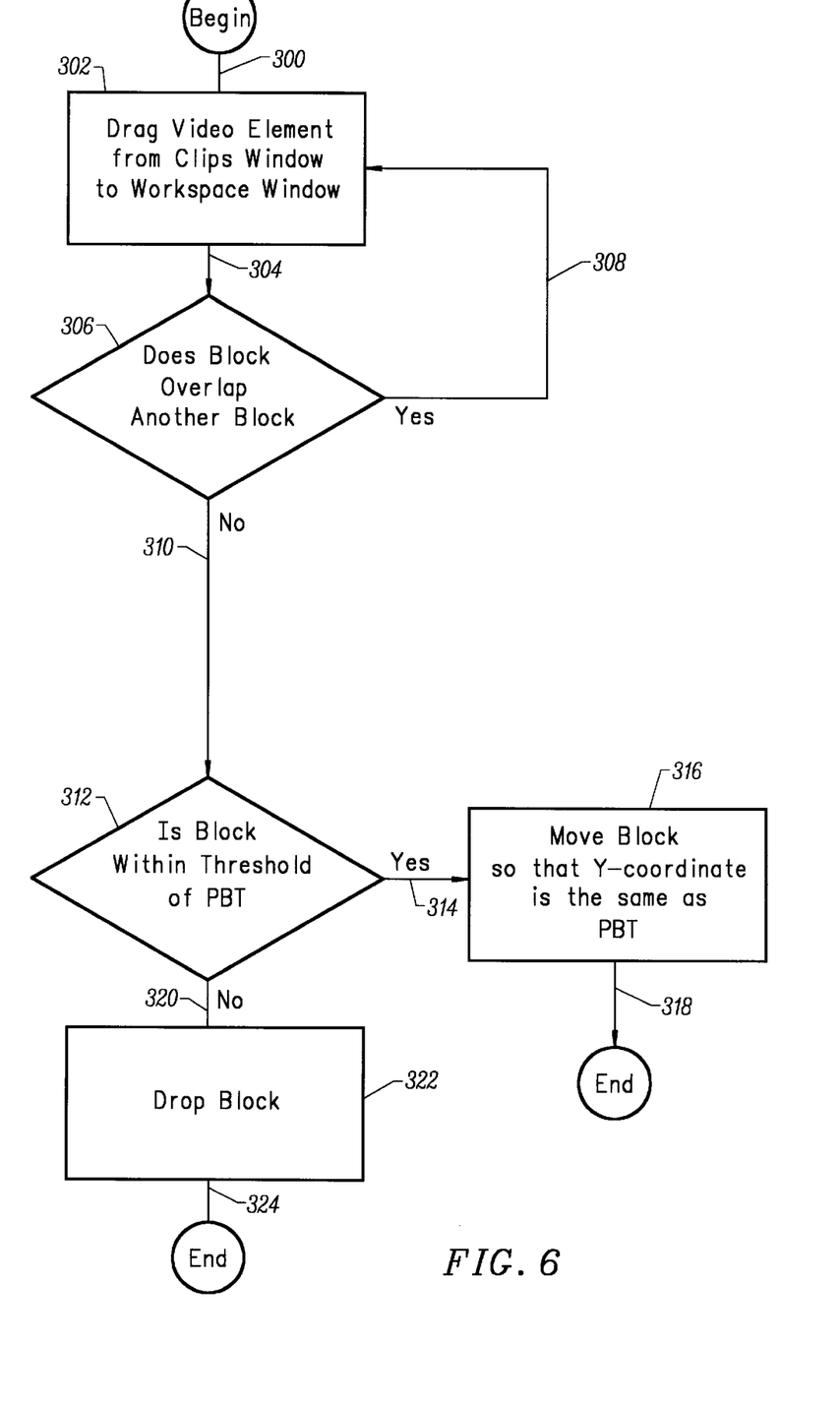
FIG. 6 is a high level flow chart of the present invention.

FIGS. 6, 7, 8 and 9 are a flow chart that describes the method of the present invention. This description takes place with respect to several blocks located in W/S/W 30. Some blocks will be joined together as a result of the attractive forces to form aggregate blocks-and thus may be broken apart. Other blocks are independent and non-subdividable. Referring now to FIG. 6, the method begins at process block 302 where a video element is dragged from clips window 12 to workspace window 30 by moving the mouse cursor to the desired thumbnail clip, depressing the mouse button, moving the mouse cursor to the desired new location for the dragged block and releasing the mouse button. From process block 302 follow process path 304 to decision block 306 where a determination is made as to whether the proposed new position to which the dragged block is being moved on workspace window 30 causes the dragged block to overlap another block. If yes follow process path 308 back to the beginning and start over since the overlap of blocks is prohibited. If the proposed new position of the dragged block does not overlap another block, follow process path 310 to decision block 312 where a determination is made as to whether the proposed new location for the dragged block is within the interaction region of playback track 70. If yes, follow process path 314 to process block 316 and reset the y coordinate of the dragged block to that of playback track 70 and end the routine. If no, follow process path 320 and drop the dragged block by resetting the x-coordinates and y-coordinates of the dragged block to those of the mouse cursor and end the routine.

Figure 7:
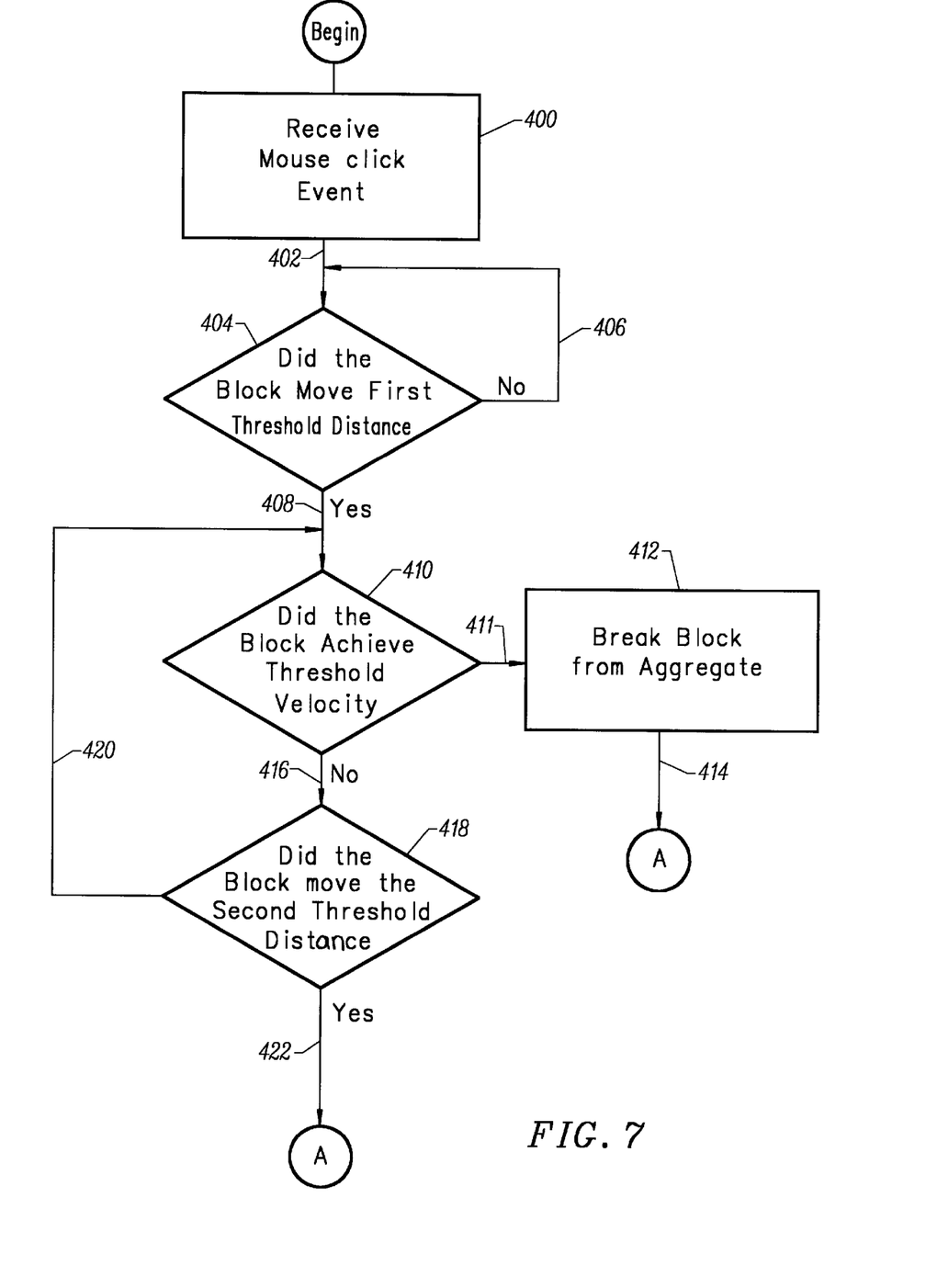
FIGS. 7, 8 and 9 are detailed flow charts of the operation of the present invention.

Referring now to FIG. 7, commence at process block 400 and receive a mouse click event. That is, the mouse cursor is within the block to be dragged and the button of the mouse button is down. When this condition is received, follow process path 402 to decision block 404 and determine if the attempted movement of the block to be dragged is greater than first threshold distance, D-1. If no, then follow process path 406 to decision block 404 and test again. This test is intended to eliminate inadvertent moves by the user, and is desirable since the computer time overhead to perform the block movements is great. However, if the intended block move is beyond the first threshold, D-1, then follow process path 408 to decision block 410 and test to determine if the block was moved at a rate that achieves a threshold velocity, V. If yes, follow process path 411 to process block 412 and break the block to be. moved from another block attached thereto. That is, to unstick blocks, the user must "yank out" the block while dragging. From process block 412, follow process path 414 to decision block 500 in FIG. 8. If the decision in decision block 410 is no, follow process path 416 to decision block 418 and test to see if the block has moved a second threshold distance, D-2. If no follow process path 420 back to decision block 410. If yes, follow process path 422 to decision block 500 in FIG. 8. The effect of decision block 410 is to determine if the user is intending to break a block from an aggregate of blocks. The effect of decision block 418 and process block 424 is to determine if the user wishes to move the aggregate block, and if so to move it. This is accomplished in decision block 410 and 418 since if the mouse cursor does not pass the velocity threshold, V, but does move a second threshold distance, D-2, which is much larger than D-1, this implies that the user intends to move the aggregate block.

Figure 8:
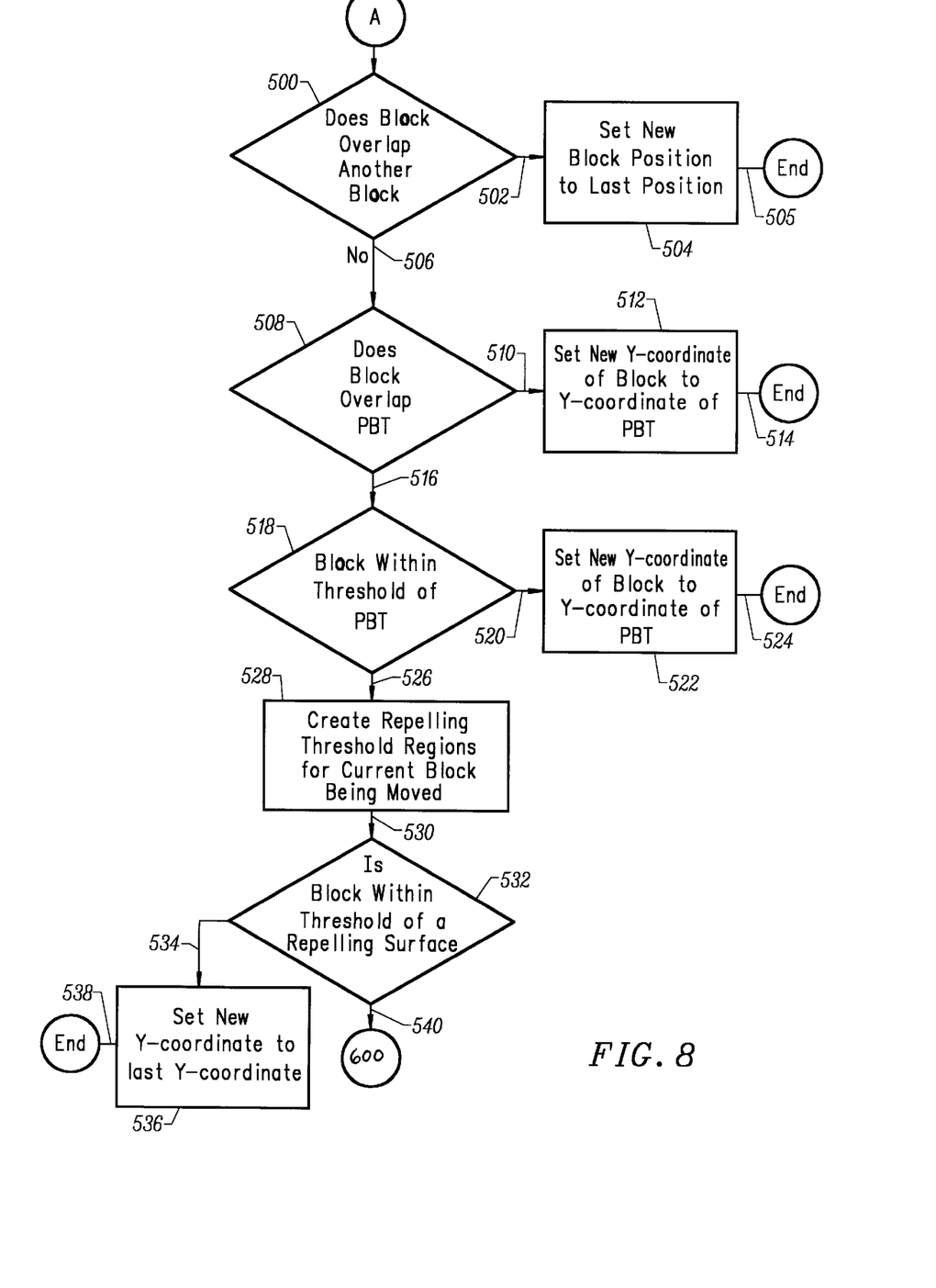

Referring now to FIG. 8 in decision block 500, the method determines if the block to be dragged overlaps another block. Here the term block includes a block that has been broken out of an aggregate block as well as the aggregate block itself. If yes, follow process path 502 to process block 504 and set the new x and y coordinates of block to be dragged to the last position of the block to be dragged. This keeps the block to be dragged in its old position. If the decision in decision block 500 is no, follow process path 506 to decision block 508 and determine if the block overlaps playback track 70. If yes, follow process path 510 to process block 512 and alter the y-coordinate of the block to be dragged to the y-coordinate of playback track 70. From process block 510, follow process path 514 and end the routine. If the decision in decision block 508 is no, follow process path 516 to decision block 518 and determine if the block to be dragged is within the threshed distance of the playback track. If yes, follow process path 520 to process block 522 and alter the y-coordinate of the block to be dragged to the y-coordinate of the playback track 70. If the decision in decision block 518 is no, follow process path 526 to process block 528 and create repelling interaction regions for block to be dragged. Then follow process path 530 to decision block 532 and determine if the block to be dragged is within the repelling region of any surface. This is accomplished as explained in connection with FIG. 5 as follows: First, the x-y coordinates of the region are delineated and then the coordinates of the block to be dragged are tested against all surfaces from which they repel.

If yes, follow process path 534 to process block 536 and set the new y-coordinate to the last y-coordinate. If the decision in decision block 532 is no, follow process path 540 to process block 600 in FIG. 9.

Figure 9:
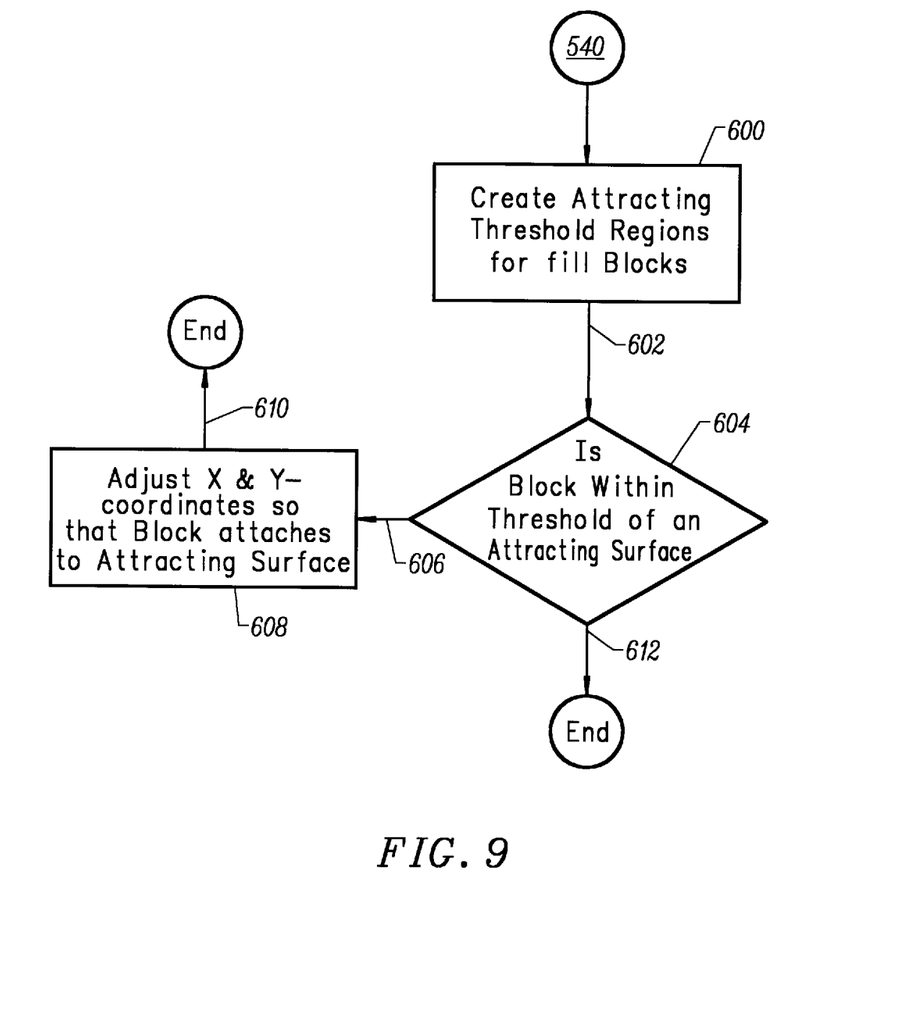

Referring now to FIG. 9, at process block delimit the y and y-coordinates of the attractive interaction regions. From process block 600 follow process path 602 to decision block 604 and determine if the block to be dragged is within the attracting region of any surface. This is accomplished as explained in connection with FIG. 5 as follows. First, the x-y coordinates of the region are delineated and then the coordinates of the block to be dragged are tested against all surfaces from which they attract. If the decision in decision block 604 is yes, follow process path 606 to process block 608 and set the y and y-coordinates of the block to be dragged such that it attaches to but does not overlap the attracting surface. From process block 608 follow process path 610 and end the routine.

It will be appreciated that the preferred embodiment of the invention as described above is subject to numerous adaptations and modifications without departing from the scope of the invention. Therefore, it is to be understood that, within the scope of the appended claims, the invention may be practiced other than as specifically described.

What is claimed is:

1. In a computer system having a CPU, memory and a video display and wherein video data is stored framewise in said memory and wherein portions of video data are represented by blocks on said video display, an improved method of manipulating said blocks on said video display, said method comprising the steps of:

specifying coordinates of interaction regions around a block to be dragged, wherein the coordinates of said interaction regions delimit the interaction regions around said block;

testing the coordinates of said interaction regions against the coordinates of all other blocks on said video display;

repelling said block to be dragged from specified surfaces of other blocks in accordance with predetermined rules that specify which surfaces of said block to be dragged and which surfaces of said other blocks repel each other based upon the coordinates of said interaction regions of said block and said other blocks; and attaching said block to be dragged to the surface of said other blocks whose coordinates are within said interaction regions in accordance with predetermined rules that specify which surfaces of said block to be dragged and which surfaces of said other blocks attract each other.

2. A method of manipulating audio-visual data, the audio-visual data being displayed on a display as a block, the method comprising:

determining a plurality of coordinates that define one or more interaction regions adjacent to the block;

comparing the location of the interaction regions of the block to the interaction regions of an other block; and adjusting the location of the block based upon the comparison of the location of the interaction regions of the block to the interaction regions of the other block and the audio-visual data represented by the block and the other block.

3. A method as recited in claim 2, wherein the block represents audio data, video data audio-video data or a transition.

4. A method as recited in claim 2, wherein the interaction regions include a top interaction region, a bottom interaction region, a left interaction region, and a right interaction region, such that the adjustment of the location of the block is based in part on the overlap of the interaction regions of the block and the interaction regions of the other block.

5. A method as recited in claim 4, wherein the step of adjusting includes:

repelling the block from the other block if the a first interaction region of the block overlaps a second interaction region of the other block.

6. A method as recited in claim 4, wherein the step of adjusting includes:

attracting the block to the other block if the a first interaction region of the block overlaps a second interaction region of the other block.

7. A method as recited in claim 6, wherein the block is attracted to the other block if the representation of the block and the other block and the first and second interaction regions are one of a group of combinations consisting of:

the block represents a video data and the other block represents a video data, and the first interaction region is the left interaction region of the block and the second interaction region is the right interaction region of the other block;

the block represents a video data and the other block represents an audio data, and the first interaction region is the left interaction region of the block and the second interaction region is the right interaction region of the other block;

the block represents a video data and the other block represents an audio data, and the first interaction region is the top interaction region of the block and the second interaction region is the bottom region of the other block; and the block represents a transition and the other block represents a video data, and the first interaction block is the left or the right interaction region of the block and the second interaction region is the left or the right interaction region of the other block.

8. A method as recited in claim 7, wherein the step of adjusting includes:

repelling the block from the other block if the first interaction region overlaps with the second interaction region but the overlap does not cause the block to be attracted to the other block.

9. A method as recited in claim 8, further comprising:

displaying a playback strip having interaction regions, the block being attracted to the playback strip if the interaction regions of the block overlap the interaction regions of the playback strip.

10. A method as recited in claim 8, further comprising:

displaying an overlay frame, the block being attracted to the overlay frame if the block represents video data.

11. An audio-video editing system implemented on a computer system having a display, the audio-video editing system comprising:

a user interface that is displayed on the display, the user interface including, a first block that represents a first data that is displayed in the user interface, and a second block that represents a second data that is displayed in the user interface;

wherein the first and the second data are manipulated by the manipulation of the first and the second blocks, the locations of the first block and the second block in the user interface being automatically affected by the relative location of the first block to the second block.

12. An audio-video editing system as recited in claim 11, wherein the first data is chosen from a group consisting of video data, audio data, audio-video data, a transition, an overlay frame and a playback strip.

13. An audio-video editing system as recited in claim 11, wherein the second data is chosen from a group consisting of video data, audio data, audio-video data and a transition.

14. An audio-video editing system as recited in claim 11, wherein the first block having interaction regions and the other block having interaction regions, the locations of the first block and the second block being automatically affected by the relative location of the interaction regions of the first block to the interaction regions of the second block.

15. An audio-video editing system as recited in claim 14, wherein the first block is repelled from the second block if the interaction regions of the first block overlaps the interaction regions of the second block.

16. An audio-video editing system as recited in claim 14, wherein the first block is attracted to the second block if the interaction regions of the first block overlaps the interaction regions of the second block.

17. An audio-video editing system as recited in claim 14, wherein the interaction regions of the first and the second blocks include a top, bottom, left and right interaction regions, the first block being attracted to the second block if the representation of the first and the second blocks and the overlap of a first interaction region of the first block and a second interaction region of the second block are one of a group of combinations consisting of:

the first block represents a video data and the second block represents a video data, and the first interaction region is the left interaction region of the block and the second interaction region is the right interaction region of the other block;

the first block represents a video data and the second block represents an audio data, and the first interaction region is the left interaction region of the block and the second interaction region is the right interaction region of the other block;

the first block represents a video data and the second block represents an audio data, and the first interaction region is the top interaction region of the block and the second interaction region is the bottom region of the other block; and the first block represents a transition and the second block represents a video data, and the first interaction block is the left or the right interaction region of the block and the second interaction region is the left or the right interaction region of the other block.

18. An audio-video editing system as recited in claim 17, wherein the first block is repelled from the second block the overlap of the interaction regions of the first and the second blocks does not cause the blocks to be attracted to each other.

19. An audio-video editing system as recited in claim 18, further comprising:

a playback strip having interaction regions that is displayed in the user interface, the first block being attracted to the playback strip if the interaction regions of the first block overlap the interaction regions of the playback strip.

20. An audio-video editing system as recited in claim 18, further comprising:

an overlay frame having interaction regions that is displayed in the user interface, the first block being attracted to the overlay frame if the interaction regions of the first block overlap the interaction regions of the playback strip.

* * * * *